US012580891B2

(12) United States Patent
Palanisamy et al.

(10) Patent No.: US 12,580,891 B2
(45) Date of Patent: Mar. 17, 2026

(54) GROUP BASED POLICY FOR NON-VIRTUAL EXTENSIBLE LOCAL AREA NETWORK DEPLOYMENTS

(71) Applicant: Juniper Networks, Inc., Sunnyvale, CA (US)

(72) Inventors: Balaji Palanisamy, Tiruppur (IN); Samatha Madhusudan Punja, Bangalore (IN); Veera Srinivas Kamana, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 98 days.

(21) Appl. No.: 18/401,089

(22) Filed: Dec. 29, 2023

(65) Prior Publication Data

US 2025/0219997 A1 Jul. 3, 2025

(51) Int. Cl.
*G06F 15/16* (2006.01)
*H04L 9/40* (2022.01)

(52) U.S. Cl.
CPC ...... *H04L 63/0245* (2013.01); *H04L 63/0876* (2013.01); *H04L 63/20* (2013.01)

(58) Field of Classification Search
CPC .. H04L 63/0245; H04L 63/0876; H04L 63/20
See application file for complete search history.

(56) References Cited

U.S. PATENT DOCUMENTS

2010/0271954 A1* 10/2010 Eswaran ............... H04L 43/028
370/241
2015/0012998 A1 1/2015 Nellikar et al.

2016/0261638 A1 9/2016 Xu et al.
2022/0045971 A1* 2/2022 Lu ........................... H04L 47/31
2023/0093278 A1* 3/2023 Majila ................ H04L 12/4645
709/238

OTHER PUBLICATIONS

Extended European Search Report for European Application No. EP24160136.8 dated Jul. 15, 2024, 10 pages.
Lin, W., et al., "Group Policy ID Bgp Draft-wlin-bess-group-policy-id-extended-community 03: Draft-wlin-bess-group-policy-id-extended-community 03.Txt", Group Policy Id Bgp Extended Community Drapt Wlin Bess Group-policy Id Extended. Community 031 Draft-wlin-bess-group-policy-id-extended.Community 03. Txt: Bess, Internet Engineering Task Force, IETF: ST on. WITH Oct. 20, 2023 (Oct. 20, 2023), pp. 1-8, XP015162847, Retrieved from the Internet: URL:https://tools.ietf.org/html/draft-wlin -bess-group-policy-id-extended community-03.

* cited by examiner

*Primary Examiner* — Normin Abedin
(74) *Attorney, Agent, or Firm* — Harrity & Harrity, LLP

(57) ABSTRACT

A network device may receive, from a server device, a first tag assigned to a first host device, and may generate a first filter based on the first tag. The network device may receive a second filter generated based on a second tag assigned to a second host device, and may generate a policy based on the first filter and the second filter. The network device may propagate the first filter and the second filter to one or more other network devices, and may receive a packet. The network device may derive a source tag and a destination tag associated with the packet, and may determine an action for the packet based on the policy, the source tag, and the destination tag. The network device may perform the action.

20 Claims, 8 Drawing Sheets

Policy

| Source Tag | Dest. Tag | Action |
|---|---|---|
| 100 | 200 | Drop |
| 400 | 600 | Accept |

145
Propagate the policy to one or more other network devices

Server device

Network device 2

Host device 2

Non-VXLAN fabric

Network device 1

Host device 1

140
Generate a policy based on the first filter and the second filter

100

100

BGP Update Message

| BGP NLRI Message – GBP Tag | | |
|---|---|---|
| ORIGIN | | |
| AS Path | ASN | |
| Extended Communities | Action GBP-Tag = 100 | |
| MP_REACH_NLRI | <AFI, SAFI> | |
| Filter match, src-mac | M1 | |

NLRI

FIG. 1D

510 — Receive, from a server device, a first tag assigned to a first host device 520 — Generate a first filter based on the first tag 530 — Receive a second filter generated based on a second tag assigned to a second host device 540 — Generate a policy based on the first filter and the second filter 550 — Propagate the first filter and the second filter to one or more other network devices

500

GROUP BASED POLICY FOR NON-VIRTUAL EXTENSIBLE LOCAL AREA NETWORK DEPLOYMENTS

BACKGROUND

A group based policy (GBP) model may define an application-centric or a business function-centric policy model in virtual extensible local area network (VXLAN) deployments where endpoint (e.g., host device) or application network access policy is independent of an underlying network topology. This helps to achieve macro-segmentation and micro-segmentation behaviors consistently across the network at scale and with minimal policy.

SUMMARY

Some implementations described herein relate to a method. The method may include receiving, from a server device, a first tag assigned to a first host device, and generating a first filter based on the first tag. The method may include receiving a second filter generated based on a second tag assigned to a second host device, and generating a policy based on the first filter and the second filter. The method may include propagating the policy to one or more other network devices.

Some implementations described herein relate to a network device. The network device may include one or more memories and one or more processors. The one or more processors may be configured to receive, from a server device, a first tag assigned to a first host device, and generate a first filter based on the first tag. The one or more processors may be configured to receive a second filter generated based on a second tag assigned to a second host device, and generate a policy based on the first filter and the second filter. The one or more processors may be configured to propagate the policy to one or more other network devices, and receive a packet. The one or more processors may be configured to derive a source tag and a destination tag associated with the packet, and determine an action for the packet based on the policy, the source tag, and the destination tag. The one or more processors may be configured to perform the action.

Some implementations described herein relate to a non-transitory computer-readable medium that stores a set of instructions. The set of instructions, when executed by one or more processors of a network device, may cause the network device to receive, from a server device, a first tag assigned to a first host device, and generate a first filter based on the first tag. The set of instructions, when executed by one or more processors of the network device, may cause the network device to receive a second filter generated based on a second tag assigned to a second host device, and generate a policy based on the first filter and the second filter. The set of instructions, when executed by one or more processors of the network device, may cause the network device to propagate the policy to one or more other network devices, and receive a packet. The set of instructions, when executed by one or more processors of the network device, may cause the network device to derive a source tag and a destination tag associated with the packet, and determine an action for the packet based on the policy, the source tag, and the destination tag.

BRIEF DESCRIPTION OF THE DRAWINGS

FIGS. 1A-1D are diagrams of an example associated with providing group based policy for non-VXLAN deployments.

DETAILED DESCRIPTION

Figure 1A:
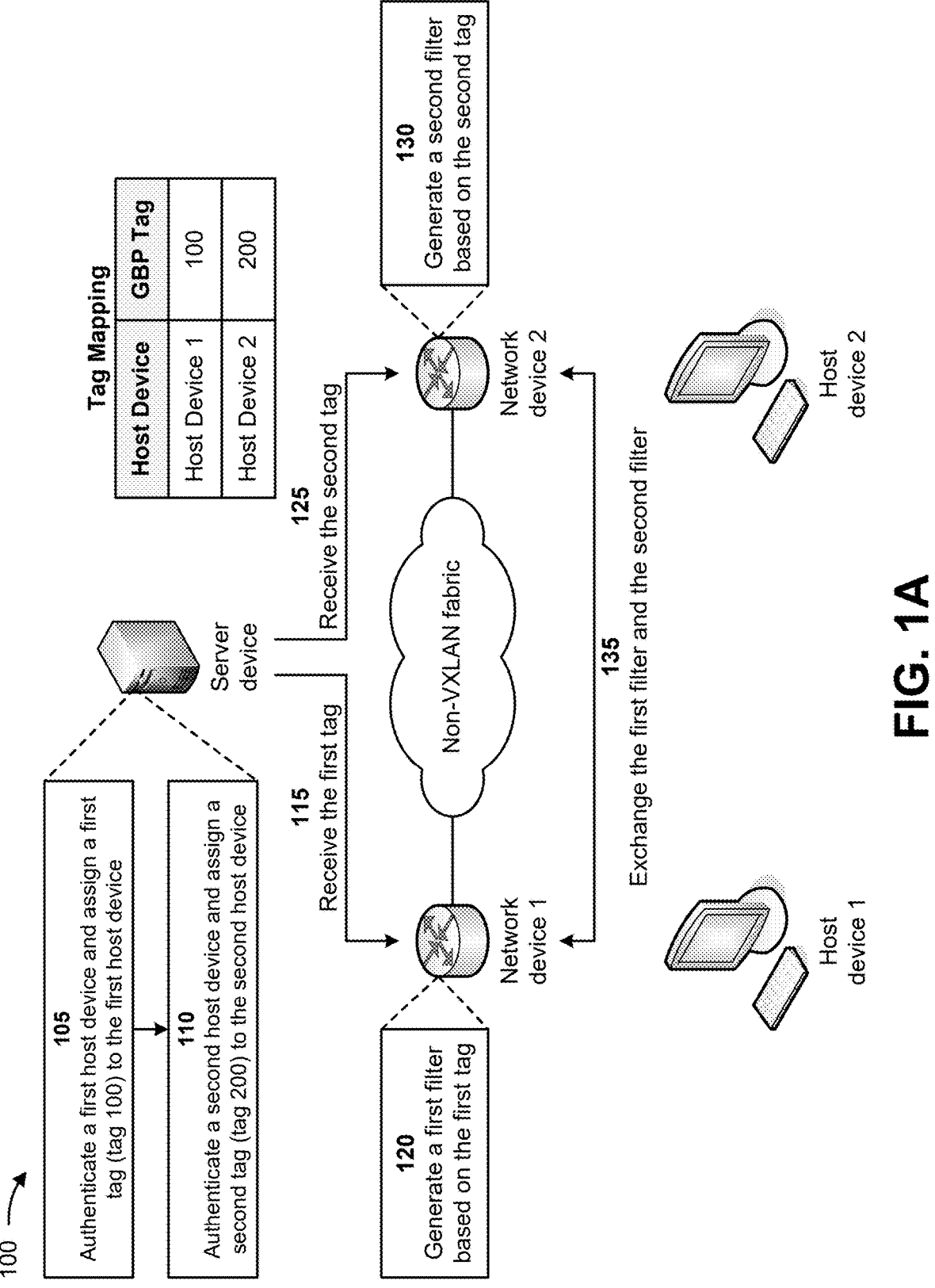

The following detailed description of example implementations refers to the accompanying drawings. The same reference numbers in different drawings may identify the same or similar elements.

In the GBP model, each endpoint or application may be associated with a tag that identifies a business function of the endpoint or the application. Groupings may be based on attributes of the endpoint or the application, such as a media access control (MAC), an Internet protocol (IP) address, a virtual local area network (VLAN) or an interface to which the endpoint is connected, and/or the like. Endpoint or application access may be controlled using groupings (e.g., tags) and by configuring policies. The tags may be provided in a "group policy identifier (ID)" field in a VXLAN header to enable separation and to determine packet priority through the network. GBP is a micro-segmentation technology tied to VXLAN because the GBP tags are provided in VXLAN header. However, there is no solution similar to GBP to achieve micro-segmentation in non-VXLAN deployments, such as an IP-fabric. Thus, current techniques for providing group based policy in non-VXLAN deployments consume computing resources (e.g., processing resources, memory resources, communication resources, and/or the like), networking resources, and/or the like, are associated with failing to provide micro-segmentation and macro-segmentation in non-VXLAN deployments, providing and handling tags provided in packets, enforcing a group based policy within a network rather than at a network ingress, handling security threats associated with unknown packets, and/or the like.

Some implementations described herein relate to a network device that provides group based policy for non-VXLAN deployments. For example, a network device may receive, from a server device, a first tag that is assigned to a first host device, and may generate a first filter. The network device propagate the policy to one or more network devices. The network device may receive a second filter generated based on a second tag from a second host device, and may generate and propagate a policy of the second filter to one or more network devices. The network device may generate a source tag for a packet by utilizing the first filter and may determine a destination tag by following the policy of the second filter. The network device may determine an action for the packet based on the policy, the source tag, and the destination tag, and may perform the action.

In this way, the network device provides group based policy for non-VXLAN deployments. For example, the network device may provide micro-segmentation and macro-segmentation in non-VXLAN deployments (e.g., IP fabrics), and may preserve fabric bandwidth since packets may be dropped at an ingress to a network (e.g., the network device). The network device may provide a security benefit by dropping all unknown flows. Flows for which the network device cannot derive tags may be treated as untrusted flows and may be discarded. The network device may conserve storage space since policies are based on groups instead of based on matching of flows. Thus, the network device conserves computing resources, networking resources, and/or the like that would otherwise have been consumed by failing to provide micro-segmentation and macro-segmentation in non-VXLAN deployments, providing and handling tags provided in packets, enforcing a group based policy within a network rather than at a network ingress, handling security threats associated with unknown packets, and/or the like.

FIGS. 1A-1D are diagrams of an example 100 associated with providing group based policy for non-VXLAN deployments. As shown in FIGS. 1A-1D, example 100 includes a first host device (e.g., host device 1), a second host device (e.g., host device 2), a server device, and a non-VXLAN fabric with a first network device (e.g., network device 1) and a second network device (e.g., network device 2). Further details of the host devices, the server device, the non-VXLAN fabric, and the network devices are provided elsewhere herein.

As shown in FIG. 1A, and by reference number 105, the server device may authenticate the first host device and assign a first tag (e.g., tag 100) to the first host device. For example, the server device may receive credentials associated with the first host device, such as a device identifier (e.g., a serial number, a network address, an international mobile equipment identity (IMEI), and/or the like), a username, a password, a pass phrase, a two-factor authentication, and/or the like. The server device may determine whether the credentials associated with the first host device match credentials stored by the server device. If the credentials associated with the first host device match credentials stored by the server device, the server device may authenticate the first host device for access and utilization of the non-VXLAN fabric. The server device may assign a first tag (e.g., GBP tag 100) to the first host device based on authenticating the first host device for access and utilization of the non-VXLAN fabric. If the credentials associated with the first host device fail to match credentials stored by the server device, the server device may not authenticate the first host device and may not assign the first tag to the first host device. In some implementations, the server device may utilize Dot1x to authenticate the first host device for access and utilization of the non-VXLAN fabric. Dot1x is a protocol for port-based network access control (PNAC) on wired and wireless access points. Dot1x defines authentication controls for any user or device trying to access a local area network (LAN) or wireless local area network (WLAN). PNAC is a proven networking concept that identifies users and devices by controlling access to a network.

As further shown in FIG. 1A, and by reference number 110, the server device may authenticate a second host device and assign a second tag (e.g., GBP tag 200) to the second host device. For example, the server device may receive credentials associated with the second host device, such as a device identifier (e.g., a serial number, a network address, an IMEI, and/or the like), a username, a password, a pass phrase, a two-factor authentication, and/or the like. The server device may determine whether the credentials associated with the second host device match credentials stored by the server device. If the credentials associated with the second host device match credentials stored by the server device, the server device may authenticate the second host device for access and utilization of the non-VXLAN fabric. The server device may assign a second tag (e.g., tag 200) (e.g., different than the first tag) to the second host device based on authenticating the second host device for access and utilization of the non-VXLAN fabric. If the credentials associated with the second host device fail to match credentials stored by the server device, the server device may not authenticate the second host device and may not assign the second tag to the second host device. In some implementations, the server device may utilize Dot1x to authenticate the second host device for access and utilization of the non-VXLAN fabric.

As further shown in FIG. 1A, a tag mapping table may include a host device field and a tag field (e.g., a GBP tag fields). The host device field may include entries identifying host devices to which the server device has assigned tags. The tag mapping table may map a GBP tag to MAC address, an IP address, and a VLAN associated with the first host device. The MAC address, the IP address, or the VLAN may be utilized to derive a source tag and a destination tag once actual traffic is received by the network device from the first host device. The entries of the host device field may include names of the host devices (e.g., Host Device 1, Host Device 2, and/or the like), device identifiers of the host devices, network addresses of the host devices, and/or the like. The tag field may include entries identifying the tags assigned to the host devices by the server device. The entries of the tag field may include names of the tags (e.g., GBP tag 100, GBP tag 200, and/or the like).

As further shown in FIG. 1A, and by reference number 115, the first network device may receive the first tag. For example, the server device may provide the first tag (e.g., tag 100), assigned to the first host device, to the first network device. The first network device may receive the first tag from the server device.

As further shown in FIG. 1A, and by reference number 120, the first network device may generate a first filter based on the first tag. For example, the first network device may convert the first tag into a first filter, such as a first border gateway protocol (BGP) flow specification (flowspec) filter. A first BGP flow specification filter may provide a way to perform traffic filtering and rate-limiting based on specific flow characteristics, such as source and destination addresses, IP protocol, source and destination ports, and/or the like. For example, the BGP flow specification filter may match on the MAC address, the IP address, the VLAN, or another packet identifier, and may be utilized to assign a GBP tag to a flow.

As further shown in FIG. 1A, and by reference number 125, the second network device may receive the second tag. For example, the server device may provide the second tag (e.g., tag 200), assigned to the second host device, to the second network device. The second network device may receive the second tag from the server device.

As further shown in FIG. 1A, and by reference number 130, the second network device may generate a second filter based on the second tag. For example, the second network device may convert the second tag into a second filter, such as a second BGP flow specification filter. A second BGP flow specification filter may provide a way to perform traffic filtering and rate-limiting based on specific flow characteristics, such as source and destination addresses, IP protocol, source and destination ports, and/or the like.

As further shown in FIG. 1A, and by reference number 135, the first network device and the second network device may exchange the first filter and the second filter. For example, the first network device may provide the first filter to the second network device, and the second network device may provide the second filter to the first network device.

Figure 1B:
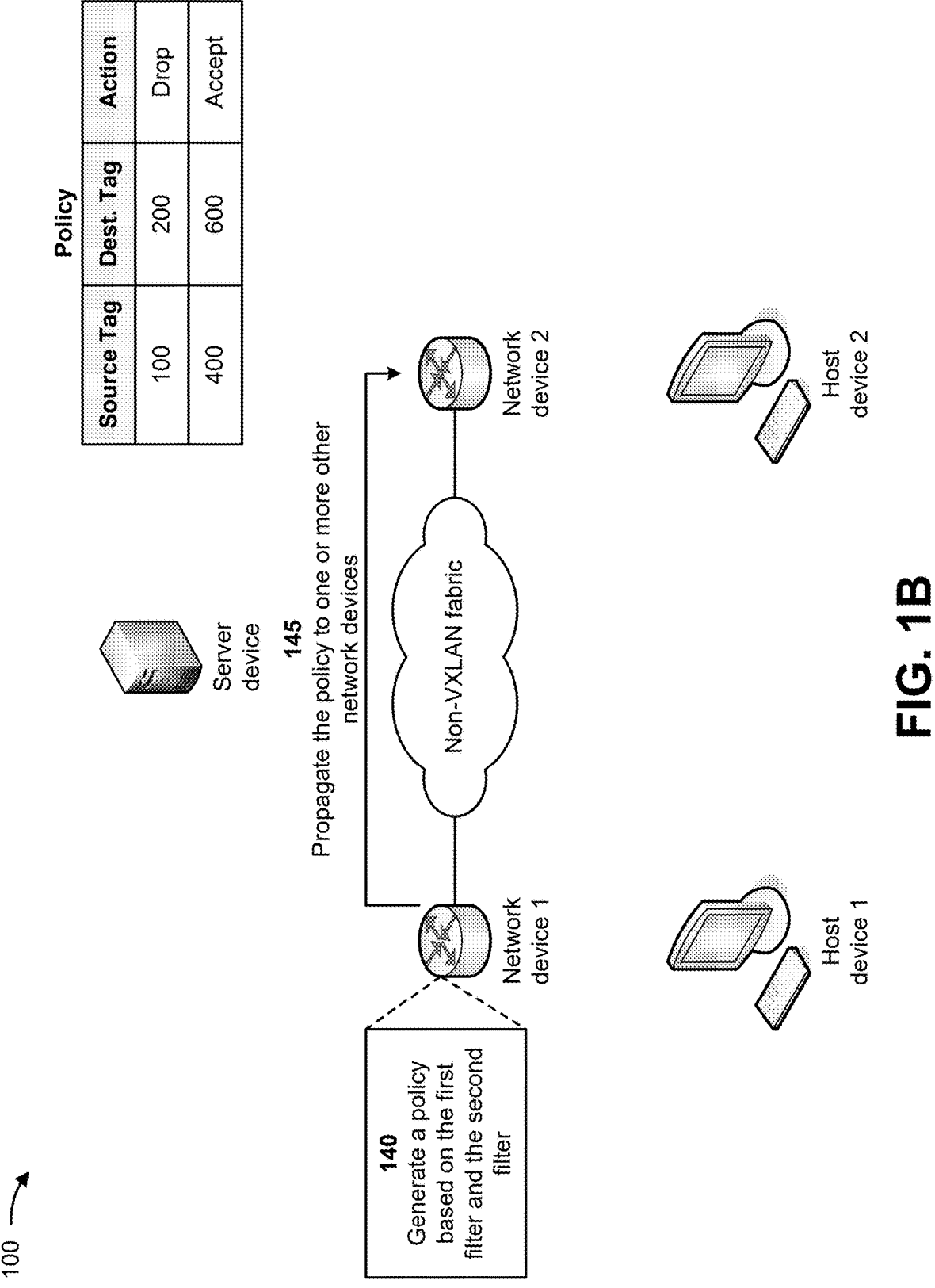

As shown in FIG. 1B, and by reference number 140, the first network device may generate a policy based on the first filter and the second filter. For example, the first network device may convert the first filter and the second filter into a policy, such as a GBP policy table. A GBP policy table may provide a way to perform traffic filtering and rate-limiting. The GBP policy table may associate tags with actions. Specific flow characteristics, such as source and destination addresses, IP address, source and destination ports, and/or the like may be associated with GBP tags in the tag mapping table. In some implementations, the GBP policy table may associate tags assigned to the host devices with actions. For example, the GBP policy table may include a source tag field, a destination tag field, and an action field. The source tag field may include entries for GBP tags associated with a source (e.g., one of the host devices) of a packet of traffic. The destination tag field may include entries for GBP tags associated with a destination (e.g., one of the host devices) of the packet of traffic. The action tag may include entries identifying actions to be performed based on the combination of the entries in the source tag field and the destination tag field. For example, if a packet is associated with a source tag of tag 100 and a destination tag of tag 200, the action field may indicate that the packet is to be dropped. In another example, if a packet is associated with a source tag of tag 400 and a destination tag of tag 600, the action field may indicate that the packet is to be accepted. The first network device may store the policy in a data structure (e.g., a database, a table, a list, and/or the like) associated with the first network device.

In some implementations, the second network device may generate the policy based on the first filter and the second filter in the manner described above for the first network device. The second network device may store the policy in a data structure associated with the second network device.

As further shown in FIG. 1B, and by reference number 145, the first network device may propagate the policy to one or more other network devices. For example, the first network device may propagate the policy to the second network device and one or more other network devices of the non-VXLAN fabric. The first network device may include network addresses of the second network device and the one or more other network devices, and may utilize the network addresses to provide the policy to the second network device and the one or more other network devices. The second network device and the one or more other network devices may store the policy in data structures associated with the second network device and the one or more other network devices. In some implementations, if the first filter is provided to the second network device and the second network device generates the policy based on the first filter and the second filter, the second network device may propagate the policy to the first network device and the one or more other network devices of the non-VXLAN fabric. In such implementations, the first network device and the one or more other network devices may store the policy in data structures associated with the first network device and the one or more other network devices.

Figure 1C:
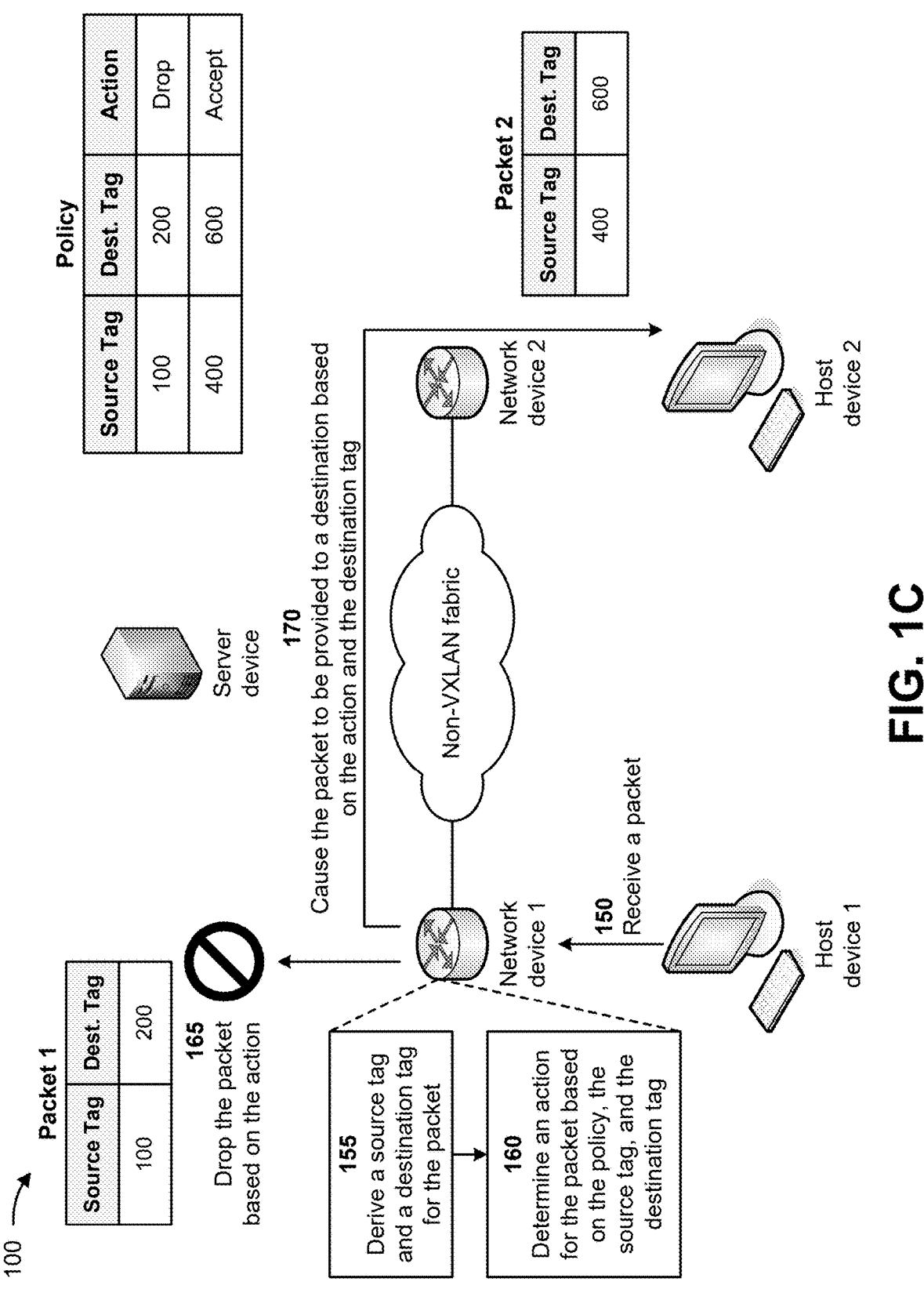

As shown in FIG. 1C, and by reference number 150, the first network device may receive a packet. For example, the first host device may generate a first packet (e.g., Packet 1), and may provide the first packet to the first network device. The first network device may receive the first packet from the first host device. Alternatively, the first host device may generate a second packet (e.g., Packet 2), and may provide the second packet to the first network device. The first network device may receive the second packet from the first host device.

As further shown in FIG. 1C, and by reference number 155, the first network device may derive a source tag and a destination tag for the packet. For example, when the packet is the first packet (e.g., Packet 1), the first network device may derive a first source tag and a first destination tag for the first packet. In one example, the first source tag may be tag 100 and the first destination tag may be tag 200. Alternatively, when the packet is the second packet (e.g., Packet 2), the first network device may derive a second source tag and a second destination tag for the second packet. In one example, the second source tag may be tag 400 and the second destination tag may be tag 600.

As further shown in FIG. 1C, and by reference number 160, the first network device may determine an action for the packet based on the policy, the source tag, and the destination tag. For example, when the packet is the first packet, the first network device may compare the first source tag (e.g., tag 100) and the first destination tag (e.g., tag 200) of the first packet with the policy, and may determine that the action set forth by the policy for the first packet with tags 100 and 200 is to drop the packet. Alternatively, when the packet is the second packet, the first network device may compare the second source tag (e.g., tag 400) and the second destination tag (e.g., tag 600) of the second packet with the policy, and may determine that the action set forth by the policy for the second packet with tags 400 and 600 is to accept the packet.

As further shown in FIG. 1C, and by reference number 165, the first network device may drop the packet based on the action. For example, when the first network device determines that the action set forth by the policy for the first packet with tags 100 and 200 is to drop the packet, the first network device may drop the first packet. Since the first packet is dropped at an ingress network device (e.g., the first network device) of the non-VXLAN fabric, bandwidth of the non-VXLAN fabric is conserved (e.g., due to no having to further process the first packet).

As further shown in FIG. 1C, and by reference number 170, the first network device may cause the packet to be provided to a destination based on the action and the destination tag. For example, when the first network device determines that the action set forth by the policy for the second packet with tags 400 and 600 is to accept the packet, the first network device may accept the packet and may cause the second packet to be provided to a destination. In some implementations, the first network device may provide the second packet to the second network device, and the second network device may forward the second packet to the second host device. This may enable micro segmentation and macro segmentation of the non-VXLAN fabric, and may provide a security benefit since all unknown flows may be dropped (e.g., flows for which tags cannot be derived may be treated as untrusted flows and may be discarded).

FIG. 1D depicts an example format of a BGP update message (e.g., BGP network layer reachability information (NLRI) message with a GBP tag). As shown, the NLRI may include a prefix and a subnet length, and path attributes. The path attributes may include an AS Path and an Origin, denoted as an autonomous system number (ASN) (e.g., a unique number allocated to each AS). The NLRI may include an action associated with a group (e.g., extended communities), and a GBP tag (e.g., "100") associated with the group. The NLRI may include an multiprotocol reach-able NLRI (MP_REACH_NLRI), which is an optional non-transitive attribute that can be used to advertise a feasible route to a peer and to advertise a network layer address of the network device that should be used as a next hop. The NLRI may include an address family identifier (AFI) field, which, in combination with a subsequent address family identifier (SAFI) field, identifies a set of network layer protocols to which an address carried in a next hop field must belong. The NLRI may also include a filter match field (e.g., a source MAC address) and a MAC route (M1) field.

In this way, the network device provides group based policy for non-VXLAN deployments. For example, the network device may provide micro-segmentation and macro-segmentation in non-VXLAN deployments (e.g., IP fabrics), and may preserve fabric bandwidth since packets may be dropped at an ingress to a network (e.g., the network device). The network device may provide a security benefit by dropping all unknown flows. Flows for which the network device cannot derive tags may be treated as untrusted flows and may be discarded. The network device may conserve storage space since policies are based on groups instead of based on matching of flows. Thus, the network device conserves computing resources, networking resources, and/or the like that would otherwise have been consumed by failing to provide micro-segmentation and macro-segmentation in non-VXLAN deployments, providing and handling tags provided in packets, enforcing a group based policy within a network rather than at a network ingress, handling security threats associated with unknown packets, and/or the like.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
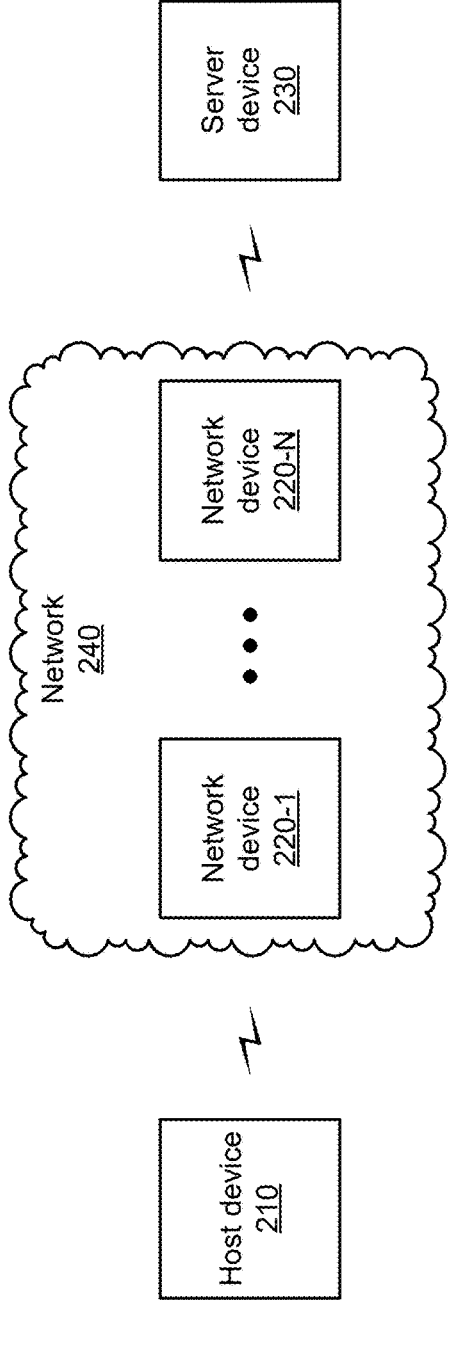
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a host device 210, a group of network devices 220 (shown as network device 220-1 through network device 220-N), a server device 230, and a network 240. Devices of the environment 200 may interconnect via wired connections, wireless connections, or a combination of wired and wireless connections.

The host device 210 includes one or more devices capable of receiving, generating, storing, processing, and/or providing information, such as information described herein. For example, the host device 210 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, a server device, a group of server devices, or a similar type of device. In some implementations, the host device 210 may receive network traffic from and/or may provide network traffic to other host devices 210 and/or the server device 230, via the network 240 (e.g., by routing packets using the network devices 220 as intermediaries).

The network device 220 includes one or more devices capable of receiving, processing, storing, routing, and/or providing traffic (e.g., a packet or other information or metadata) in a manner described herein. For example, the network device 220 may include a router, such as a label switching router (LSR), a label edge router (LER), an ingress router, an egress router, a provider router (e.g., a provider edge router or a provider core router), a virtual router, a route reflector, an area border router, or another type of router. Additionally, or alternatively, the network device 220 may include a gateway, a switch, a firewall, a hub, a bridge, a reverse proxy, a server (e.g., a proxy server, a cloud server, or a data center server), a load balancer, and/or a similar device. In some implementations, the network device 220 may be a physical device implemented within a housing, such as a chassis. In some implementations, the network device 220 may be a virtual device implemented by one or more computer devices of a cloud computing environment or a data center. In some implementations, a group of network devices 220 may be a group of data center nodes that are used to route traffic flow through the network 240.

The server device 230 may include one or more devices capable of receiving, generating, storing, processing, providing, and/or routing information, as described elsewhere herein. The server device 230 may include a communication device and/or a computing device. For example, the server device 230 may include a server, such as an application server, a client server, a web server, a database server, a host server, a proxy server, a virtual server (e.g., executing on computing hardware), or a server in a cloud computing system. In some implementations, the server device 230 may include computing hardware used in a cloud computing environment.

The network 240 includes one or more wired and/or wireless networks. For example, the network 240 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
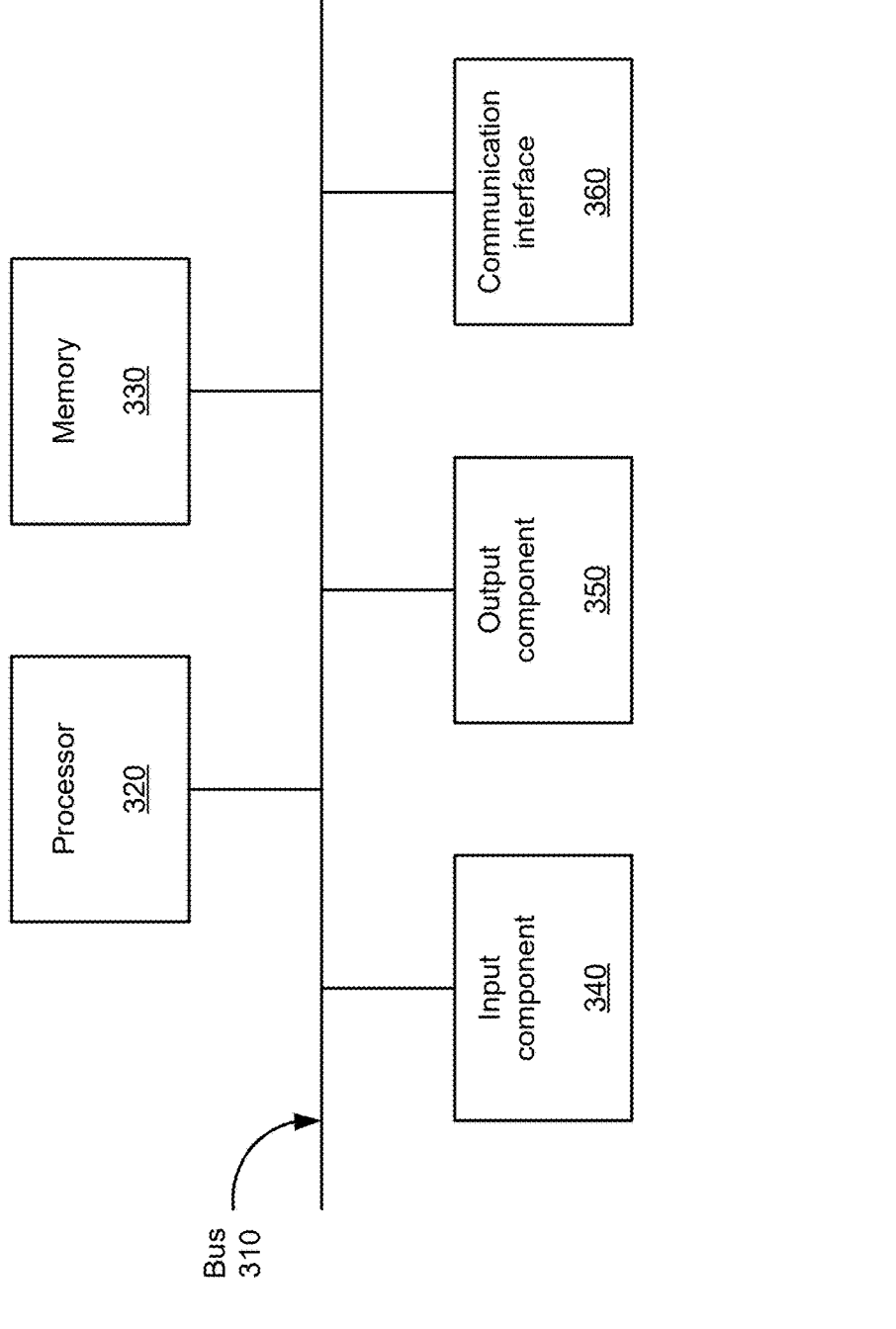
FIGS. 3 and 4 are diagrams of example components of one or more devices of FIG. 2.

FIG. 3 is a diagram of example components of one or more devices of FIG. 2. The example components may be included in a device 300, which may correspond to the host device 210, the network device 220, and/or the server device 230. In some implementations, the host device 210, the network device 220, and/or the server device 230 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hard-wired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
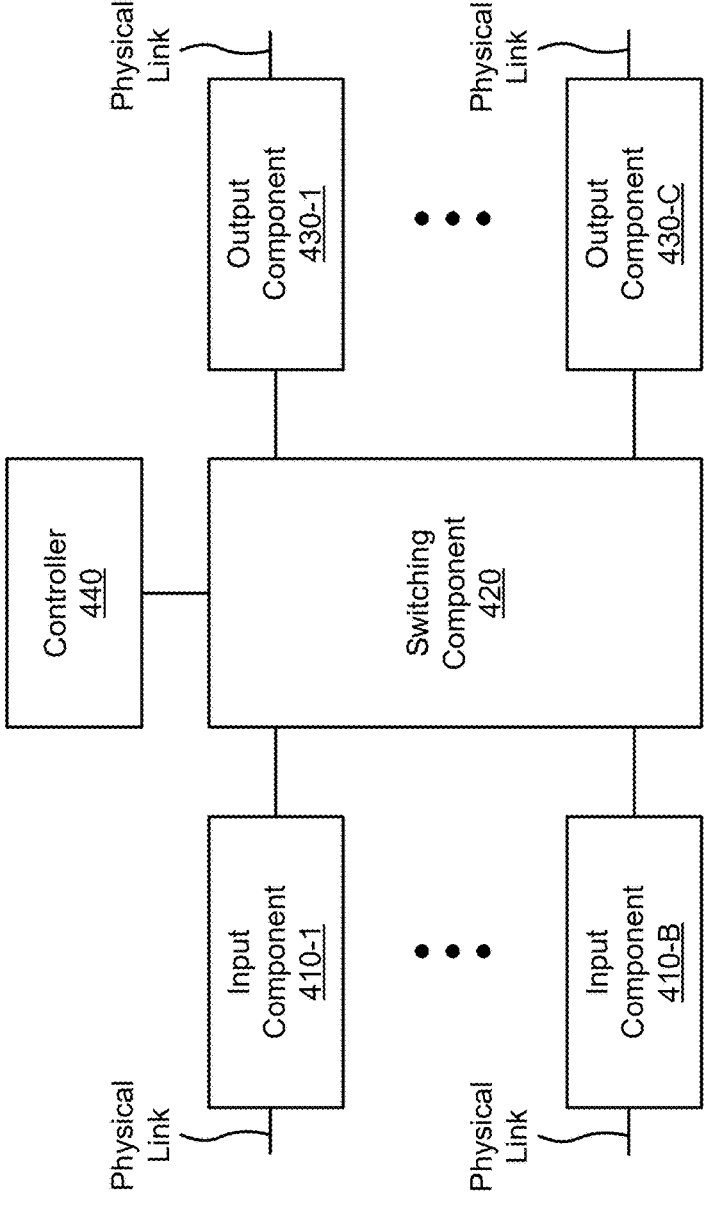

FIG. 4 is a diagram of example components of one or more devices of FIG. 2. The example components may be included in a device 400. The device 400 may correspond to the network device 220. In some implementations, the network device 220 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software.

In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
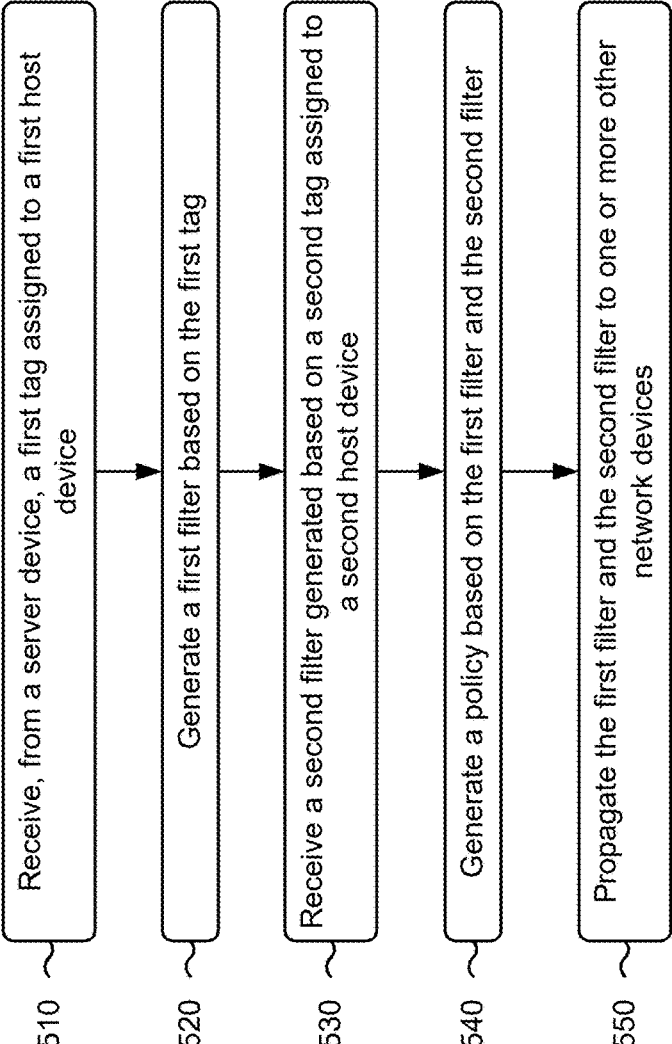
FIG. 5 is a flowchart of an example process for providing group based policy for non-VXLAN deployments.

FIG. 5 is a flowchart of an example process 500 for providing group based policy for non-VXLAN deployments. In some implementations, one or more process blocks of FIG. 5 may be performed by a network device (e.g., the network device 220). In some implementations, one or more process blocks of FIG. 5 may be performed by another device or a group of devices separate from or including the network device, such as a host device (e.g., the host device 210) and/or a server device (e.g., the server device 230). Additionally, or alternatively, one or more process blocks of FIG. 5 may be performed by one or more components of the device 300, such as the processor 320, the memory 330, the input component 340, the output component 350, and/or the communication interface 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include receiving, from a server device, a first tag assigned to a first host device (block 510). For example, the network device may receive, from a server device, a first tag assigned to a first host device, as described above. In some implementations, the server device is to authenticate the first host device and assign the first tag to the first host device. In some implementations, the network device is an ingress device for the first host device.

As further shown in FIG. 5, process 500 may include generating a first filter based on the first tag (block 520). For example, the network device may generate a first filter based on the first tag, as described above.

As further shown in FIG. 5, process 500 may include receiving a second filter generated based on a second tag assigned to a second host device (block 530). For example, the network device may receive a second filter generated based on a second tag assigned to a second host device, as described above. In some implementations, the server device is to authenticate the second host device and assign the second tag to the second host device. In some implementations, each of the first filter and the second filter is a BGP flow specification filter. In some implementations, each of the first tag and the second tag is a GBP tag.

As further shown in FIG. 5, process 500 may include generating a policy based on the first filter and the second filter (block 540). For example, the network device may generate a policy based on the first filter and the second filter, as described above.

As further shown in FIG. 5, process 500 may include propagating the first filter and the second filter to one or more other network devices (block 550). For example, the network device may propagate the first filter and the second filter to one or more other network devices, as described above. In some implementations, the network device and the one or more other network devices are associated with a non-VXLAN. In some implementations, propagating the first filter and the second filter to the one or more other network devices includes generating BGP NLRI that includes the first filter and the second filter, and propagating the BGP NLRI to the one or more other network devices. In some implementations, one of the one or more other network devices is an egress device for the second host device.

In some implementations, process 500 includes receiving a packet, deriving a source tag and a destination tag associated with the packet, determining an action for the packet based on the policy, the source tag, and the destination tag, and performing the action. In some implementations, performing the action includes dropping the packet. In some implementations, performing the action includes causing the packet to be provided to a destination based on the destination tag and via the one or more other network devices. In some implementations, the source tag corresponds to the first tag and the destination tag corresponds to the second tag.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated other- wise. Also, as used herein, the term "or" is intended to be inclusive when used in a series and may be used inter- changeably with "and/or," unless explicitly stated otherwise (e.g., if used in combination with "either" or "only one of").

In the preceding specification, various example embodi- ments have been described with reference to the accompa- nying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, by a network device and from a server device, a first tag assigned to a first host device;
generating, by the network device, a first filter based on the first tag;
receiving, by the network device, a second filter generated based on a second tag assigned to a second host device;
generating, by the network device, a policy based on the first filter and the second filter; and propagating, by the network device, the first filter and the second filter to one or more other network devices using a BGP update message, wherein an extended communities field within the BGP update message is set to indicate the first tag or the second tag, and one or more actions associated with the policy.

2. The method of claim 1, further comprising:
receiving a packet;
deriving a source tag and a destination tag associated with the packet;
determining an action of the one or more actions for the packet based on the policy, the source tag, and the destination tag; and
performing the action.

3. The method of claim 2,
wherein performing the action comprises dropping the packet.

4. The method of claim 2,
wherein performing the action comprises causing the packet to be provided to a destination based on the destination tag and via the one or more other network devices.

5. The method of claim 2,
wherein the source tag corresponds to the first tag and the destination tag corresponds to the second tag.

6. The method of claim 1,
wherein the server device is to authenticate the first host device and assign the first tag to the first host device.

7. The method of claim 1,
wherein the server device is to authenticate the second host device and assign the second tag to the second host device.

8. A network device, comprising:
one or more memories; and
one or more processors to:
receive, from a server device, a first tag assigned to a first host device;
generate a first filter based on the first tag;
receive a second filter generated based on a second tag assigned to a second host device;
generate a policy based on the first filter and the second filter;
propagate the first filter and the second filter to one or more other network devices using a BGP update message, wherein an extended communities field within the BGP update message is set to indicate the first tag or the second tag, and one or more actions associated with the policy;
receive a packet;
derive a source tag and a destination tag associated with the packet;
determine an action of the one or more actions for the packet based on the policy, the source tag, and the destination tag; and
perform the action.

9. The network device of claim 8,
wherein the network device and the one or more other network devices are associated with a non-virtual extensible local area network.

10. The network device of claim 8,
wherein each of the first filter and the second filter is a border gateway protocol flow specification filter.

11. The network device of claim 8,
wherein the one or more processors, to propagate the first filter and the second filter to the one or more other network devices, are to:
generate border gateway protocol (BGP) network layer reachability information (NLRI) that includes the first filter and the second filter; and propagate the BGP NLRI to the one or more other network devices.

12. The network device of claim 8, wherein each of the first tag and the second tag is a group based policy tag.

13. The network device of claim 8, wherein the network device is an ingress device for the first host device.

14. The network device of claim 8, wherein one of the one or more other network devices is an egress device for the second host device.

15. A non-transitory computer-readable medium storing a set of instructions, the set of instructions comprising:

one or more instructions that, when executed by one or more processors of a network device, cause the network device to:

receive, from a server device, a first tag assigned to a first host device;

generate a first filter based on the first tag;

receive a second filter generated based on a second tag assigned to a second host device;

generate a policy based on the first filter and the second filter;

propagate the first filter and the second filter to one or more other network devices using a BGP update message, wherein an extended communities field within the BGP update message is set to indicate the first tag or the second tag, and one or more actions associated with the policy;

receive a packet;

derive a source tag and a destination tag associated with the packet; and determine an action of the one or more actions for the packet based on the policy, the source tag, and the destination tag.

16. The non-transitory computer-readable medium of claim 15, wherein the one or more instructions further cause the network device to one of:

drop the packet based on the action; or cause, based on the action, the packet to be provided to a destination based on the destination tag and via the one or more other network devices.

17. The non-transitory computer-readable medium of claim 15, wherein the source tag corresponds to the first tag and the destination tag corresponds to the second tag.

18. The non-transitory computer-readable medium of claim 15, wherein the network device and the one or more other network devices are associated with a non-virtual extensible local area network.

19. The non-transitory computer-readable medium of claim 15, wherein each of the first filter and the second filter is a border gateway protocol flow specification filter.

20. The non-transitory computer-readable medium of claim 15, wherein the one or more instructions, that cause the network device to propagate the first filter and the second filter to the one or more other network devices, cause the network device to:

generate border gateway protocol (BGP) network layer reachability information (NLRI) that includes the first filter and the second filter; and propagate the BGP NLRI to the one or more other network devices.

* * * * *